Patented Apr. 7, 1953

2,634,274

UNITED STATES PATENT OFFICE 2,634,274

BASICALLY SUBSTITUTED N-ALKYL DERIVATIVES OF α,α-DITOLYLPROPIONAMIDE AND SALTS THEREOF

Carl Peter Krimmel, Mundelein, Ill., assignor to G. D. Searle & Co., Chicago, Ill., a corporation of Illinois No Drawing. Application March 10, 1951,
Serial No. 215,025

12 Claims. (Cl. 260—294)

The present invention relates to a new type of organic compound and specifically to the basically substituted N-alkyl derivatives of α,α-ditolylpropionamide and salts thereof. The compounds may be represented by the following structural formula

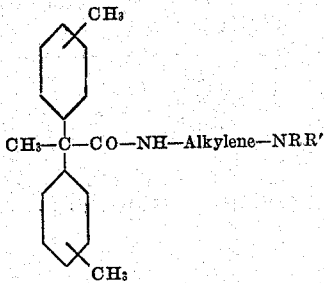

wherein the radical NRR' is a member of the class consisting of dialkylamino radicals and nitrogen-containing heteromonocyclic radicals attached to the alkylene radical through the nitrogen in the heterocycle, and salts thereof.

In the foregoing structural formula, the alkylene radical represents a bivalent saturated aliphatic hydrocarbon radical of no more than ten carbon atoms. These radicals are derived from straight-chain or branched-chain aliphatic hydrocarbons and include such radicals as ethylene, propylene, butylene, amylene, and polymethylene radicals such as trimethylene, tetramethylene, pentamethylene, and hexamethylene.

Among the radicals which R and R' may represent are such lower aliphatic radicals as methyl, ethyl, propyl, butyl, amyl, hexyl, and the corresponding haloalkyl and hydroxyalkyl radicals, wherein the propyl, butyl, amyl and hexyl groups may be either of the straight-chain or branched-chain type. These radicals also include saturated nitrogen-containing heteromonocyclic radicals attached to the alkylene radical through a nitrogen in the heterocycle. Such heterocyclic radicals as piperidine, lupetidine, pyrrolidine, morpholine, thiamorpholine, piperazine, and N'-alkylpiperazine are within the scope of the invention.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

These amides are conveniently prepared by heating an α,α-ditolylpropionyl halide with the corresponding N,N-dialkylaminoalkylamine or heterocyclylalkylamine in an anhydrous organic solvent.

The propionamides of this invention have been found to possess a number of useful therapeutic properties. They have been found to be of special promise as cardiovascular agents in producing vasodilatation, reducing blood pressure, and exerting a negative inotropic effect on the heart.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples, temperatures are given uncorrected in degrees centigrade (°C.), amounts of materials in grams (g.), parts by volume in milliliters (ml.), and pressures in millimeters (mm.) of mercury.

Example 1

To a stirred solution of 44 g. of α,α-di(ortho-, meta-, or para-tolyl)propionyl chloride dissolved in 1000 ml. of anhydrous ethyl ether, 16.3 g. of γ-dimethylaminopropylamine are introduced by dropwise addition. The gummy white deposit is dissolved in dilute hydrochloric acid and the acid layer is separated, made alkaline, and ether extracted. The extract is dried over anhydrous potassium carbonate, filtered, and ether stripped. The residue is vacuum distilled to yield a colorless syrup. In the case of the α,α-di(p-tolyl)-N-(γ-dimethylaminopropyl)propionamide the base boils at about 190–200° C. and 0.3 mm. pressure. These compounds have the structural formula

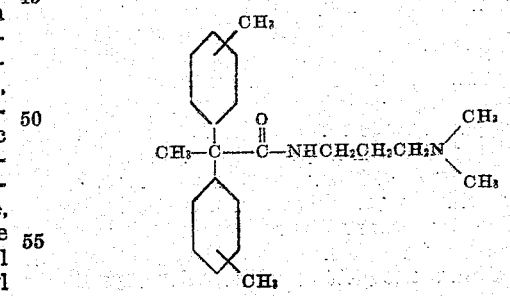

Example 2

A solution of 12 g. of $\alpha,\alpha$-di-(p-tolyl)-N-($\gamma$-dimethylaminopropyl)propionamide, 20 ml. of butanone, and 8 g. of ethyl bromide is sealed in a shielded pressure bottle and heated in the steam bath for three hours. Following the usual precautions, the bottle is cooled and opened. The reaction mixture is refrigerated and touched with a drop of ether to induce crystallization. The crystal cake is filtered and recrystallized from butanone. The ethobromide of $\alpha,\alpha$-di-(p-tolyl)-N-($\gamma$-dimethylaminopropyl)propionamide thus obtained consists of white, water-soluble, crystalline flakes melting at 177.5–178.5° C. It has the structural formula

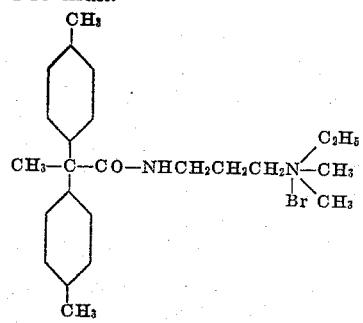

Example 3

The $\alpha,\alpha$-di(p-tolyl)-N-($\gamma$-diethylaminopropyl)-propionamide is obtained by treatment of 44 g. of $\alpha,\alpha$-di(p-tolyl)propionyl chloride with 19.6 g. of $\gamma$-diethylaminopropylamine by the method of Example 1. The base is obtained as a colorless syrup with a distillation range of about 204–213° C. at 0.3 mm. pressure.

Example 4

In the manner of Example 2, 15 g. of $\alpha,\alpha$-di(p-tolyl)-N-($\gamma$-diethylaminopropyl)propionamide, 3.7 g. of ethyl bromide, and 15 ml. of butanone are caused to react. The ethobromide consists of white, water-soluble, crystalline flakes melting at 205–206° C. It has the structural formula

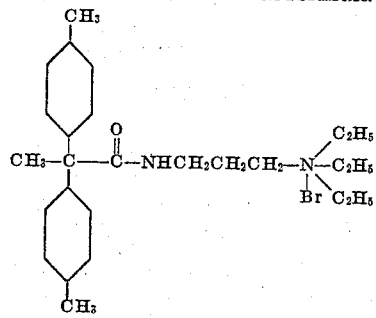

Example 5

To a stirred solution of 44 g. of $\alpha,\alpha$-di(p-tolyl)-propionyl chloride dissolved in 200 ml. of acetone, 20.5 g. of $\beta$-piperidinoethylamine are introduced by dropwise addition. After refluxing for three hours and removing the acetone by vacuum distillation on the steam bath, the residue is taken up in water and ether extracted. The water layer is made alkaline, ether extracted, and the extract dried over anhydrous potassium carbonate. The dried, ether-stripped extract is vacuum distilled to yield a pale orange syrup which is collected at 225–233° C. and 0.5 mm. pressure. One part of the base is dissolved in six parts of butanone, an equivalent of hydrogen chloride as a 10% solution in anhydrous isopropanol is added, and the solution is refrigerated and scratched. Recrystallization from butanone yields a white, microcrystalline, water-soluble, powder melting at 158–159° C. The hydrochloride of $\alpha,\alpha$-di(p-tolyl)-N-($\beta$-piperidinoethyl)propionamide has the structural formula

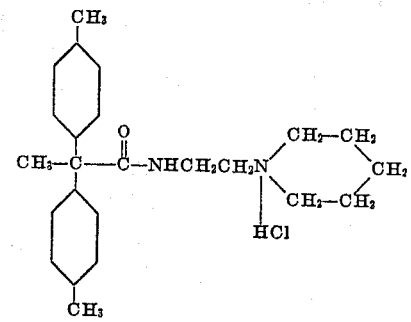

The corresponding $\alpha,\alpha$-di(o-tolyl) and $\alpha,\alpha$-di(m-tolyl)-N-(morpholinoethyl)propionamides are obtained as practically colorless oils by the identical method, using the same proportions of materials.

I claim:

1. The new group of organic compounds consisting of the basically substituted N-alkyl derivatives of $\alpha,\alpha$-ditolylpropionamides which may be represented by the structural formula

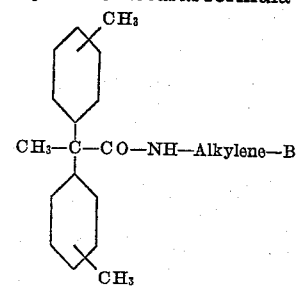

and non-toxic salts thereof, wherein Alkylene is a lower alkylene radical containing a minimum of 2 carbon atoms and B is a member of the class consisting of lower dialkylamino radicals and piperidino radicals.

2. The $\alpha,\alpha$-ditolyl-N-dialkylaminoalkylpropionamides of the structural formula

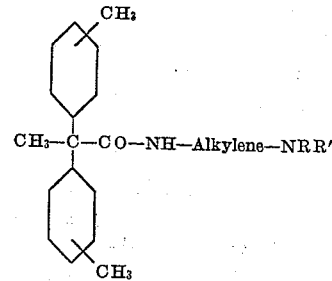

wherein R and R' are lower alkyl radicals, and Alkylene is a lower alkylene radical containing at least 2 carbon atoms.

3. The $\alpha,\alpha$-di(p-tolyl)-N-dialkylaminoalkylpropionamides of the structural formula

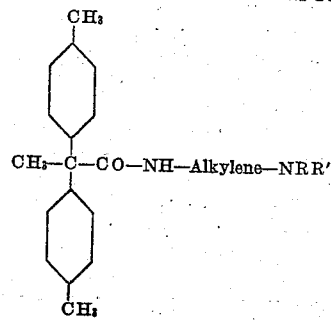

wherein R and R' are lower alkyl radicals, and Alkylene is a lower alkylene radical containing at least 2 carbon atoms.

4. The α,α-di(p-tolyl)-N-dialkylaminopropyl-propionamides of the structural formula

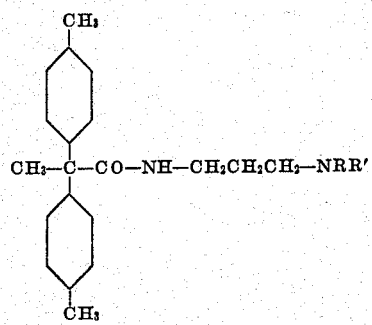

wherein R and R' are lower alkyl radicals.

5. The quaternary ammonium derivatives of α,α-ditolyl-N-dialkylaminoalkylpropionamides of the structural formula

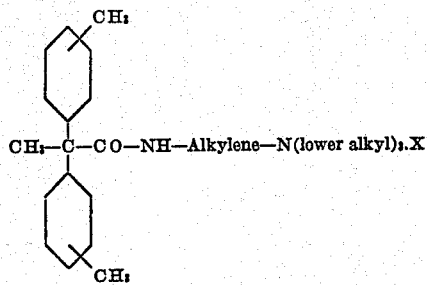

wherein X is one equivalent of a non-toxic anion and Alkylene is a lower alkylene radical containing at least 2 carbon atoms.

6. The quaternary ammonium derivatives of α,α-di(p-tolyl)-N-dialkylaminoalkylpropion-amides of the structural formula

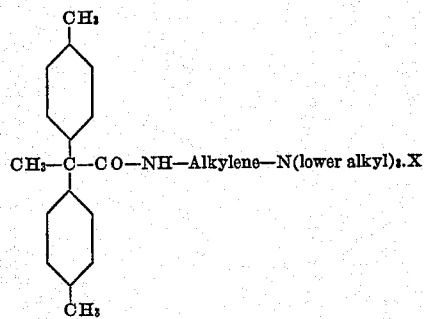

wherein X is one equivalent of a non-toxic anion and Alkylene is a lower alkylene radical containing at least 2 carbon atoms.

7. The quaternary ammonium derivatives of α,α-di(p-tolyl)-N-dialkylaminopropylpro-pionamides of the structural formula

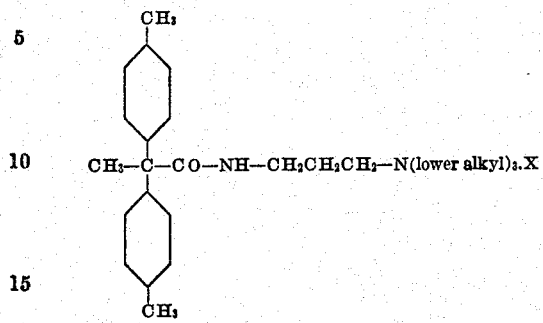

wherein X is one equivalent of a non-toxic anion.

8. α,α-Di(p-tolyl)-N,N-(γ-dimethylamino-propyl) propionamide.

9. α,α-Di(p-tolyl)-N,N-(γ-diethylamino-propyl) propionamide.

10. The ethohalides of α,α-di(p-tolyl)-N,N-(γ-diethylaminopropyl) propionamide.

11. The N-piperidinoalkyl-α,α-ditolylpropion-amides of the structural formula

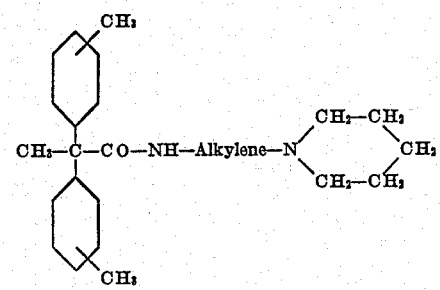

wherein Alkylene is a lower alkylene radical containing at least 2 carbon atoms.

12. N-(β-piperidinoethyl)-α,α-di(p-tolyl)pro-pionamide.

CARL PETER KRIMMEL.

REFERENCES CITED

The following references are of record in the file of this patent:

UNITED STATES PATENTS

| Number | Name | Date |
|---|---|---|
| 2,351,833 | Northey et al. | June 20, 1944 |

OTHER REFERENCES

Zaugg et al.: J. Am. Chem. Soc., vol. 72, pp. 3004–3007 (July 1950).

Lynn: "Organic Chemistry," (Lea et al., 3rd ed.), p. 188 (1948).